US008417849B2

(12) United States Patent
Hardy et al.

(10) Patent No.: US 8,417,849 B2
(45) Date of Patent: Apr. 9, 2013

(54) APPARATUS AND METHOD TO ADJUST A MULTI-PATH DEVICE RESERVATION

(75) Inventors: Clint Alan Hardy, Tucson, AZ (US); Matthew Joseph Kalos, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 12/575,380

(22) Filed: Oct. 7, 2009

(65) Prior Publication Data

US 2011/0082951 A1    Apr. 7, 2011

(51) Int. Cl.
 *G06F 3/00*    (2006.01)
(52) U.S. Cl.
 USPC ............ 710/38; 710/36; 710/37; 710/39; 710/40; 710/41; 710/42; 710/43; 710/44; 710/45; 710/46; 710/47; 710/48; 710/49; 710/50; 710/51
(58) Field of Classification Search .................. None
 See application file for complete search history.

(56) References Cited

U.S. PATENT DOCUMENTS

| | | | | |
|---|---|---|---|---|
| 4,396,984 A | * | 8/1983 | Videki, II | 710/38 |
| 4,455,605 A | * | 6/1984 | Cormier et al. | 710/38 |
| 5,452,421 A | * | 9/1995 | Beardsley et al. | 714/4.1 |
| 7,464,019 B1 | * | 12/2008 | Serrano et al. | 703/25 |
| 7,620,710 B2 | * | 11/2009 | Kottomtharayil et al. | 709/223 |
| 2005/0004998 A1 | * | 1/2005 | Mizuno | 709/219 |
| 2007/0043854 A1 | * | 2/2007 | Shum et al. | 709/224 |
| 2007/0055737 A1 | * | 3/2007 | Yamashita et al. | 709/213 |
| 2007/0143497 A1 | * | 6/2007 | Kottomtharayil et al. | 709/238 |
| 2007/0198797 A1 | * | 8/2007 | Kavuri et al. | 711/165 |
| 2008/0046609 A1 | * | 2/2008 | Shum et al. | 710/33 |
| 2008/0228987 A1 | * | 9/2008 | Yagi et al. | 710/316 |
| 2009/0125679 A1 | * | 5/2009 | Takeuchi | 711/114 |
| 2009/0187708 A1 | * | 7/2009 | Kurokawa | 711/114 |
| 2010/0095310 A1 | * | 4/2010 | Oshins | 719/327 |

OTHER PUBLICATIONS

Microsoft, Highly Available Storage: Multipathing and the Microsoft MPIO Driver Architecture, White Paper, Oct. 2003.*

* cited by examiner

*Primary Examiner* — Henry Tsai
*Assistant Examiner* — Jing-Yih Shyu
(74) *Attorney, Agent, or Firm* — Dale F. Regelman; Quarles & Brady LLP (57) ABSTRACT

A method to adjust a multi-path device reservation by supplying a computing device and a storage controller interconnected with a communication link. The method further reserves a data storage device in communication with the storage controller, where that data storage device reservation is held by a first communication path group comprising a first plurality of communication paths configured in the communication link. If the method detects a failed communication path configured in the first communication path group, the method configures a second communication path group by removing the failed communication path from the first communication path group, wherein the second communication path group maintains the data storage device reservation.

9 Claims, 10 Drawing Sheets

APPARATUS AND METHOD TO ADJUST A MULTI-PATH DEVICE RESERVATION

FIELD OF THE INVENTION

The invention is directed to an apparatus and method to adjust a multi-path device reservation. In certain embodiments, the invention is directed to an apparatus and method to adjust a multi-path data storage device reservation for a data storage device in communication with a storage controller, wherein that storage controller is in multi-path communication with a host computer.

BACKGROUND OF THE INVENTION

Computing devices generate information. It is known in the art to store such information using a plurality of data storage devices disposed in a data storage system. An originating host computer communicates with a storage controller using a plurality of communication paths. The storage controller is in communication with a plurality of data storage devices.

SUMMARY OF THE INVENTION

A method to adjust a multi-path device reservation is provided. The method supplies a computing device, a storage controller, and a communication link interconnecting the computing device and the storage controller. The method further reserves a data storage device in communication with the storage controller, where that data storage device reservation is held by a first communication path group comprising a first plurality of communication paths configured in the communication link. If the method detects a failed communication path configured in the first communication path group, the method configures a second communication path group by removing the failed communication path from the first communication path group, wherein the second communication path group maintains the data storage device reservation.

A multi-path reserve/recovery apparatus is provided. Applicants' multi-path reserve/recovery apparatus comprises an establish module, a resign module, a disband module, and a remove port module. The establish module establishes one or more communication path groups for one or more data storage devices in communication with a storage controller. The resign module issues a resign command to remove from a path group a path on which the resign command is sent. The disband module issues a disband command that disbands (e.g., ungroups) all communication paths in a communication path group addressed to a data storage device. The remove port module can remove a particular communication path or paths in a communication path group passing through a particular control unit port

BRIEF DESCRIPTION OF THE DRAWINGS

The novel features characteristic of the invention are set forth in the appended claims. The invention itself, however, as well as a preferred mode of use, further purposes and advantages thereof, will best be understood by reference to the following detailed description of the preferred embodiments when read in conjunction with the accompanying drawings, where:

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 5:
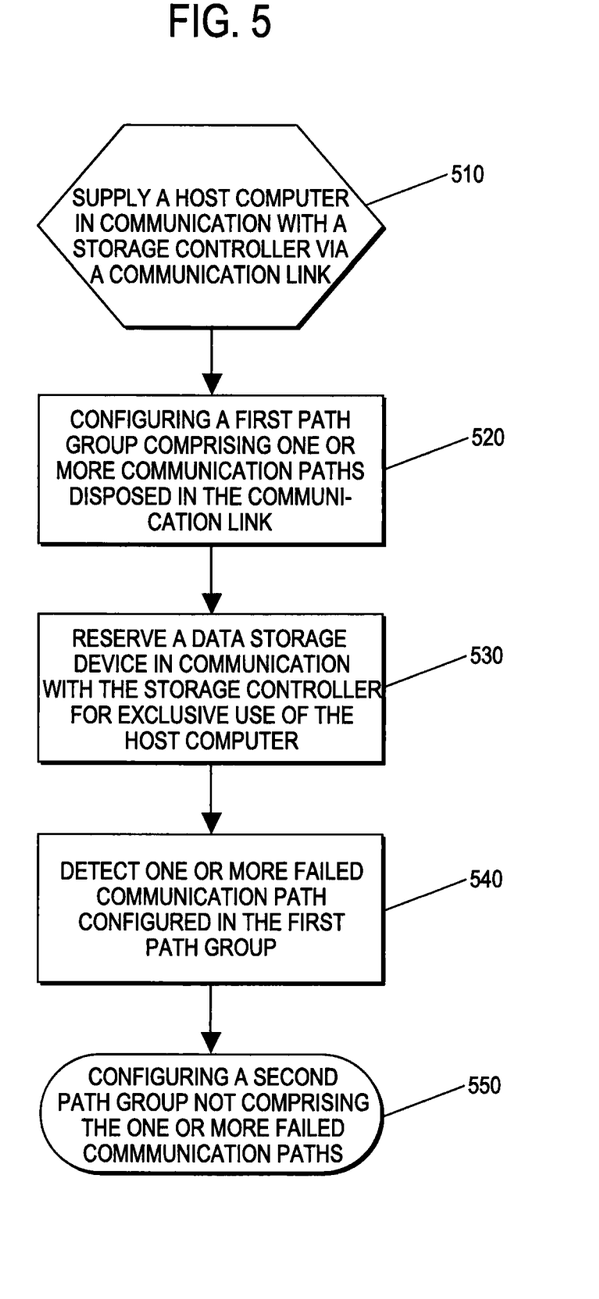
FIG. 5 summarizes the steps of Applicants' method.

The schematic flow chart diagram included are generally set forth as logical flow-chart diagrams (e.g., FIG. 5). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIG. 5). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
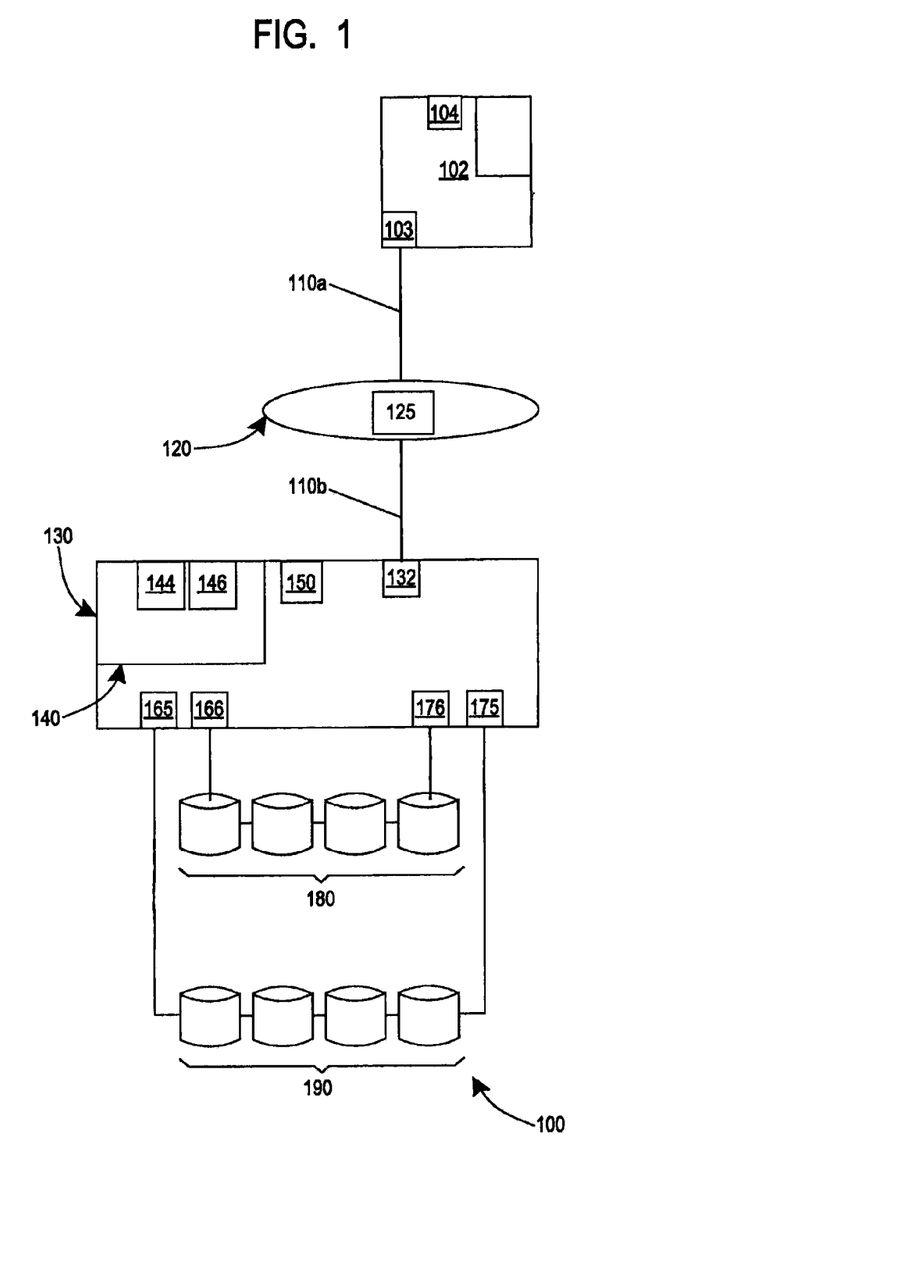
FIG. 1 illustrates Applicants' data storage system.

Referring to FIG. 1, data storage system 100 comprises storage controller 130 which interconnects a plurality of data storage drives 180 and/or a plurality of data readable medium 140. Storage controller 130 further comprises storage controller processor 150, wherein storage controller processor 150 utilizes microcode 144 to operate storage controller 130, and instructions 146 to implement Applicants' method described hereinbelow.

In certain embodiments, storage controller 130 communicates with plurality of data storage drives 180 and/or a plurality of data storage drives 190 using any sort of I/O protocol 134, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

In certain embodiments, storage controller 130 comprises an Enterprises Storage System ("ESS"), such as a TotalStorage® Enterprise Storage Server® (ESS), DS8000, DS6000, and/or a BladeCenter from IBM (IBM is a registered trademark of International Business Machines Corporation). In certain embodiments, the storage controller 130 comprises a FICON (Fiber Connectivity) attached Tape product, VTS (Virtual Tape Server), SVC (San Volume Controller) from IBM.

By "data storage device," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, storage controller 130 is in communication with a computing device 102. In certain embodiments, computing device 102 comprises a host computer, wherein that host computer generates data, and provides that data to storage controller 130.

Storage controller 130 writes the data to one or more of a plurality of data storage devices 180 and/or 190. In the illustrated embodiment of FIG. 1, storage controller 130 is in communication with one host computer 102. In other embodiments, storage controller 130 is in communication with a plurality of host computers. As a general matter, host computer 102 comprises a computing device, such as a mainframe, personal computer, workstation, and combinations thereof, including an operating system such as z/OS, MVS, LINUX, etc. (z/OS is a registered trademark and MVS is a trademark of International Business Machines Corporation; and LINUX is a registered trademark of Linus Torvald).

In certain embodiments, host computer 102 comprises an IBM S/370, S/390 type computer or other computers. For example, in certain embodiments, host computer 102 comprises an IBM System Z computer, such as System z9®, System z10, zSeries®, etc.

In certain embodiments, host computer 102 further comprises a host application 104 wherein host application 104 comprises a storage management program. In certain embodiments, that storage management program includes the functionality of storage management type programs known in the art that manage the transfer of data to and from a storage controller 130, such as for example and without limitation the IBM DFSMS (Data Facility System Managed Storage) implemented in the IBM MVS operating system. FIG. 1 shows a single host application per host. In other embodiments, the one or more host computers 102 comprise more than one host applications.

In the illustrated embodiment of FIG. 1, host computer 102 and storage controller 130 communicate with one another via fabric 120. In certain embodiments, fabric 120 comprises, for example, one or more switches 125. In certain embodiments, those one or more switches 125 include one or more conventional router switches.

Host computer 102 includes a channel path identifier (CHPid) 103, wherein CHPid 103 is interconnected to fabric 120 via physical communication path 110a. Storage controller 130 comprises a host adapter 132, wherein host adapter 132 is interconnected to fabric 120 via physical communication path 110b. In the illustrated embodiment of FIG. 1, one or more switches 125 interconnect host computer 102 to storage controller 130 via communication paths 110a and 110b, using any type of I/O interface, for example, a Fibre Channel, Infiniband, Gigabit Ethernet, Ethernet, TCP/IP, iSCSI, SCSI I/O interface, or one or more signal lines used by FC switch 125 to transfer information through, to, and from storage controller 130, and subsequently the plurality of data storage devices 180 and/or 190.

For example, in certain embodiments, fabric 120 may comprise Enterprise Systems Connection (ESCON) switches, a FICON (Fiber Connectivity) switches, and/or combinations thereof that couple host computer 102 to the storage controller 130. In certain embodiments, for example, the fabric 120 may be configured as ESCON switches that use optical fiber technology to couple the host computer 102 to storage controller 130. In certain embodiments, for example, the fabric 120 may be configured as fibre channel (FC) switches that are compatible with fibre channel (FC) protocol. The FC switches host computer 102 to the storage controller 130.

In the illustrated embodiment of FIG. 1, storage controller 130 further comprises host adapter 132 and device adapters 165, 166, 175, and 176. In other embodiments, storage controller 130 comprises a plurality of host adapters. Each host adapter may include one or more Fibre Channel ports, one or more FICON ports, one or more ESCON ports, or one or more SCSI ports.

Processor 150 communicates with plurality of data storage devices 180 and 190, utilizing device adapters 165, 166, 175, and 176, and I/O protocol 134. In certain embodiments, I/O protocol 134 comprises a fibre channel arbitrated ("FC-AL") loop. In other embodiments, I/O protocol 134 comprises other network topologies and devices, including without limitation SAS devices and/or SATA devices.

Data storage system 100 comprises a logical configuration, whereunder various physical devices disposed in the data storage system 100 are configured as one or more logical objects, logical subsystems, logical unit numbers, and/or logical volumes. For example, in certain embodiments, a storage system architect, such as z/Architecture® provided by IBM Corporation, is used to create a logical configuration for data storage system 100.

Figure 2A:
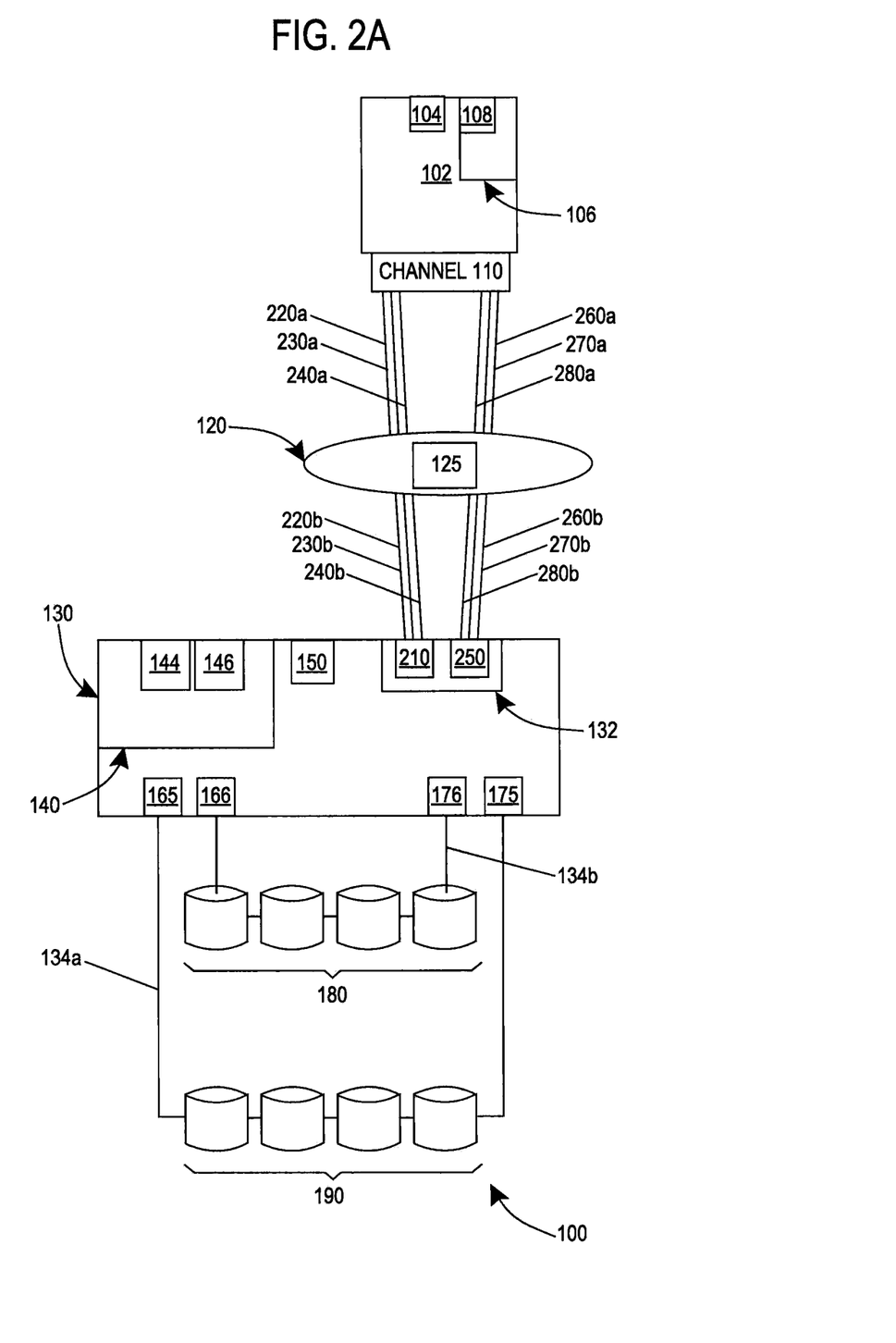
FIG. 2A illustrates a plurality of communication paths interconnecting the host computer and the storage controller of FIG. 1.

FIG. 2A illustrates communications pathways in the data storage system 100. One or more hosts 102 may be coupled to storage controller 130 via input/output (I/O) channel 110. In certain embodiments, each host 102 comprises one or more I/O channel 110. Storage controller 130, for example, provides the logical capabilities required to operate and control one or more data storage devices, and adapts the characteristics of each of plurality of data storage devices 180 and 190 to respond to control provided by a channel program of host 102.

In certain embodiments, I/O channel 110 comprises a FCP (Fibre Channel Protocol) channel, a FICON (Fibre Connection)/ESCON (Enterprise Systems Connection) channel, and/or combinations thereof. For example, in certain embodiments, host 102 comprises a System z from IBM Corporation that supports FCP I/O architecture and/or FICON/ESCON I/O architecture.

In certain embodiments, storage controller may be housed separately from the plurality of data storage devices 180 and/or 190. In certain embodiments, storage controller 130 may be physically and logically integrated with plurality of data storage devices 180 and/or 190. In certain embodiments, storage controller 130 may be physically and logically integrated within a channel subsystem (CSS) of a host 102. For example, host 102 may include a server, such as an IBM System Z server, wherein storage controller is physically and logically integrated within the CSS of the server. In certain embodiments, storage controller 130 may be physically and logically integrated within the host 102, such as for example an IBM System Z server.

As illustrated in FIG. 2A, channel 110 may comprise a plurality of channel paths, such as channel paths 220 *a/b*, 230 *a/b*, 240 *a/b*, 260 *a/b*, 270 *a/b*, and 280 *a/b*, wherein commands and data are sent across the channel paths 220 *a/b*, 230 *a/b*, 240 *a/b*, 260 *a/b*, 270 *a/b*, and 280 *a/b*, to plurality of data storage devices 180 and/or 190. In the illustrated embodiment of FIG. 2A, channel paths 220 *a/b*, 230 *a/b*, 240 *a/b*, interconnect with control unit port 210 disposed in host adapter 132 disposed in storage controller 130. Further in the illustrated embodiment of FIG. 2A, channel paths 260*a/b*, 270 *a/b*, 280 *a/b*, interconnect with control unit port 250 disposed in host adapter 132 disposed in storage controller 130. In certain embodiments, channels paths 220 *a/b*, 230 *a/b*, 240 *a/b*, 260 *a/b*, 270 *a/b*, and 280 *a/b*, may include physical paths, logical paths, and combinations thereof.

Figure 2B:
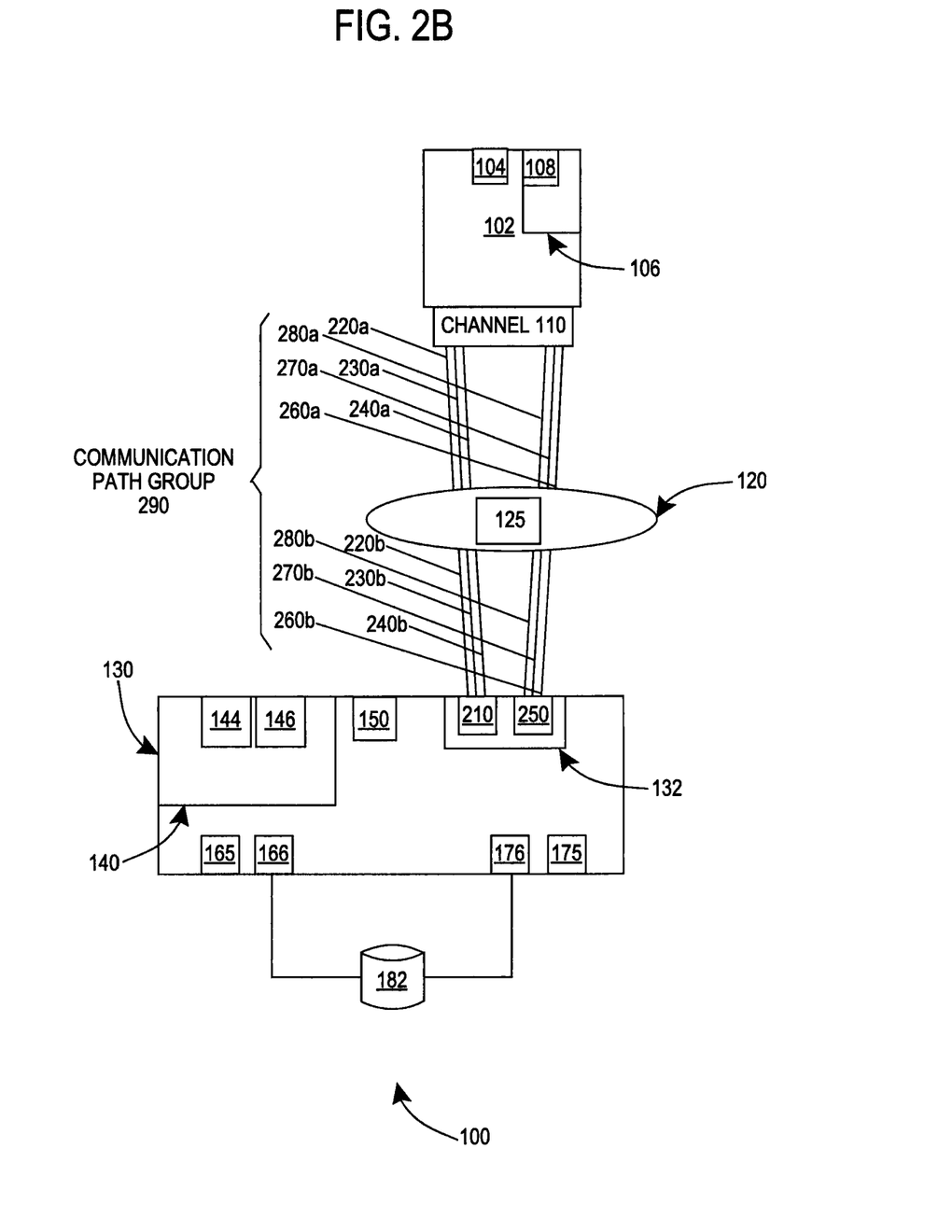
FIG. 2B illustrates the plurality of communication paths of FIG. 2A configured in a first communication path group.

Referring now to FIG. 2B, channel paths 220*a/b*, 230*a/b*, 240*a/b*, 260*a/b*, 270*a/b*, and 280*a/b*, may be grouped into a channel path group, such as channel path group 290. Within path group 290, communications between the host 102 and data storage device 182 are multi-path among the paths in such path groups (e.g., path group 290). In certain embodiments, a data storage device, such as data storage device 182, may be assigned for exclusive use with the one or more paths of a communication path group 290. For example, in certain embodiments, host 102 may reserve a data storage device for a period of time to perform a sequence of operations. In certain embodiments, the reservation of the I/O device 182 may be executed by a multi-path reserve/recovery apparatus 300 (see e.g., FIGS. 3A-3B).

Figure 3A:
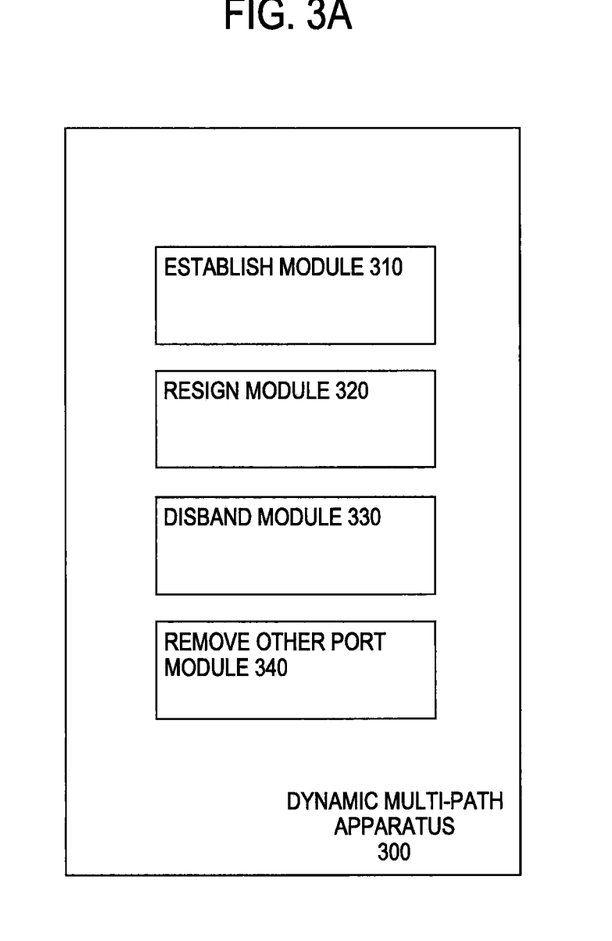
FIG. 3A illustrates the elements of a multi-path reserve/recovery apparatus.

FIG. 3A illustrates an embodiment of Applicants' multi-path reserve/recovery apparatus 300. In the illustrated embodiment of FIG. 3A, multi-path reserve/recovery apparatus 300 comprises an establish module 310, a resign module 320, a disband module 330, and a remove other port module 340.

Many of the functional units described in this specification have been labeled as modules (e.g., modules 310-340, FIG. 3A) in order to more particularly emphasize their implementation independence. For example, a module (e.g., modules 310-340, FIG. 3A) may be implemented as a hardware circuit comprising custom VLSI circuits or gate arrays, off-the-shelf semiconductors such as logic chips, transistors, or other discrete components. A module (e.g., modules 310-340, FIG. 3A) may also be implemented in programmable hardware devices such as field programmable gate arrays, programmable array logic, programmable logic devices, or the like.

Modules (e.g., modules 310-340, FIG. 3A) may also be implemented in software for execution by various types of processors. An identified module of executable code may, for instance, comprise one or more physical or logical blocks of computer instructions which may, for instance, be organized as an object, procedure, or function. Nevertheless, the executables of an identified module (e.g., modules 310-340, FIG. 3A) need not be physically collocated, but may comprise disparate instructions stored in different locations which, when joined logically together, comprise the module and achieve the stated purpose for the module.

Indeed, a module of executable code (e.g., modules 310-340, FIG. 3A) may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In certain embodiments, the establish module 310 comprises computer executable code stored on a computer readable medium such as a memory of a host computer 102. In certain embodiments, the code may be executed by a processor such as a host computer processor. In certain embodiments, the code may be stored in memory of a storage controller 130 and executed by a storage controller processor 150.

The establish module 310 establishes one or more groups of paths for one or more data storage devices in communication with a storage controller, such as storage controller 130. For example, establish module 310 establishes path group 290 for I/O device 182. In the illustrated embodiment of FIG. 2B, establish module 310 places the I/O device 182 in a grouped state wherein all paths in the group are identified as belonging to host 102.

In certain embodiments, resign module 320 comprises computer executable code stored on a computer readable medium such as a memory of a host computer 102. In certain embodiments, the code may be executed by a processor such as a host computer processor. In certain embodiments, the code may be stored in memory of a storage controller 130 and executed by a storage controller processor 150.

The resign module 320 issues a resign command to remove from a path group a path on which the resign command is sent. For example and referring to FIGS. 2B and 3A, resign module 320 could send a resign command on path 220*a/b* to remove path 220*a/b* from path group 290 for I/O device 182. Those skilled in the art will appreciate that a resign command cannot be used to remove a failed communication path from a path group because the resign command cannot be sent via such an already-failed path.

In certain embodiments, disband module 330 comprises computer executable code stored on a computer readable medium such as a memory of a host computer 102. In certain embodiments, the code may be executed by a processor such as a host computer processor. In certain embodiments, the code may be stored in memory of a storage controller 130 and executed by a storage controller processor 150.

The disband module 330 issues a disband command that disbands (e.g., ungroups) all paths in a path group addressed to a data storage device. For example and referring to FIGS.

2B and 3A, disband module 330 could disband all paths 220a/b, 230a/b, 240a/b, 260a/b, 270a/b, and 280a/b, configured to comprise path group 290 for reserved data storage device 182. Paths 220a/b, 230a/b, 240a/b, 260a/b, 270a/b, and 280a/b, are ungrouped, and the reserve remains with the path that issued the disband command. For example, if path 230a/b issued the disband command, path 230a/b remains reserved.

In certain embodiments, remove port module 340 comprises computer executable code stored on a computer readable medium such as a memory of a host computer 102. In certain embodiments, the code may be executed by a processor such as a host computer processor. In certain embodiments, the code may be stored in memory of a storage controller 130 and executed by a storage controller processor 150.

Figure 2C:
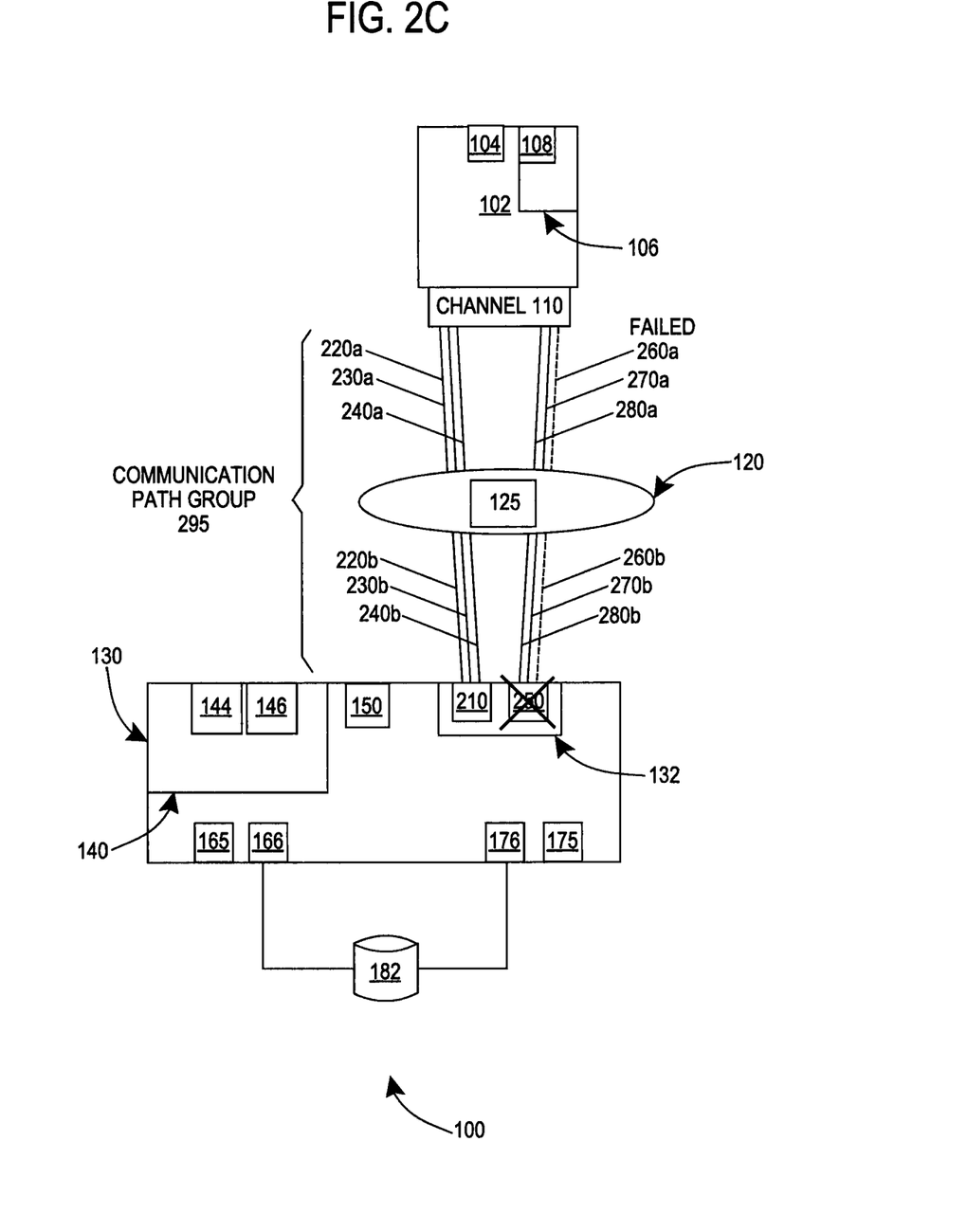
FIG. 2C illustrates a failed communication path and a second communication path group configured to exclude the failed communication path.

The remove port module 340 can remove a particular path or paths in a path group 290 passing through a particular control unit port from a path group by issuing a remove port command through a different control unit port. Referring to FIG. 2C, if path 260a fails the remove port module 340 issues a remove port command on a communication path interconnected with control unit port 210 to remove from communication path group 290 all paths passing through control unit port 295. Implementation of such a remove port command effectively configures a second communication path group 250 comprising communication paths passing through control unit port 210, i.e. communication paths 220 a/b, 230 a/b, and 240 a/b.

Figure 3B:
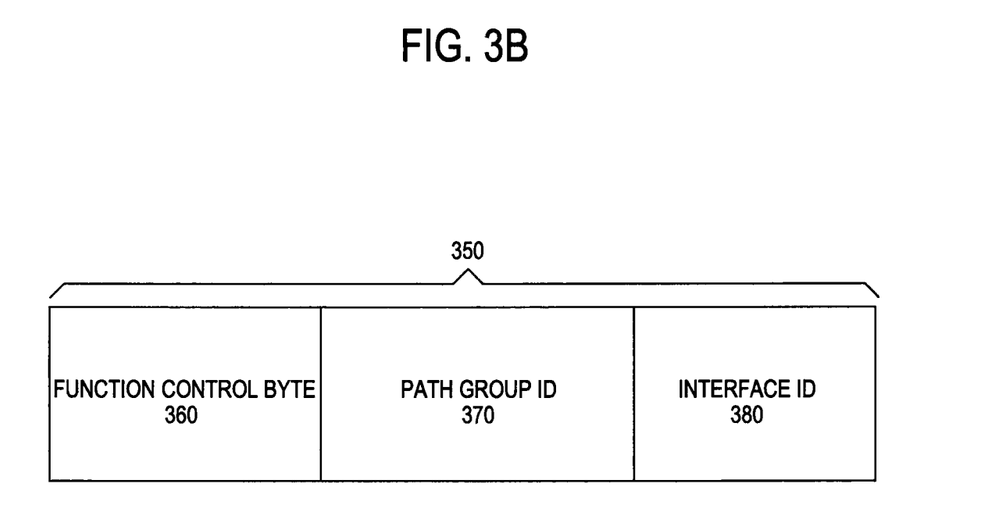
FIG. 3B recites one embodiment of Applicants' Set-Path-group-ID (SPID) command.
Figure 4A:
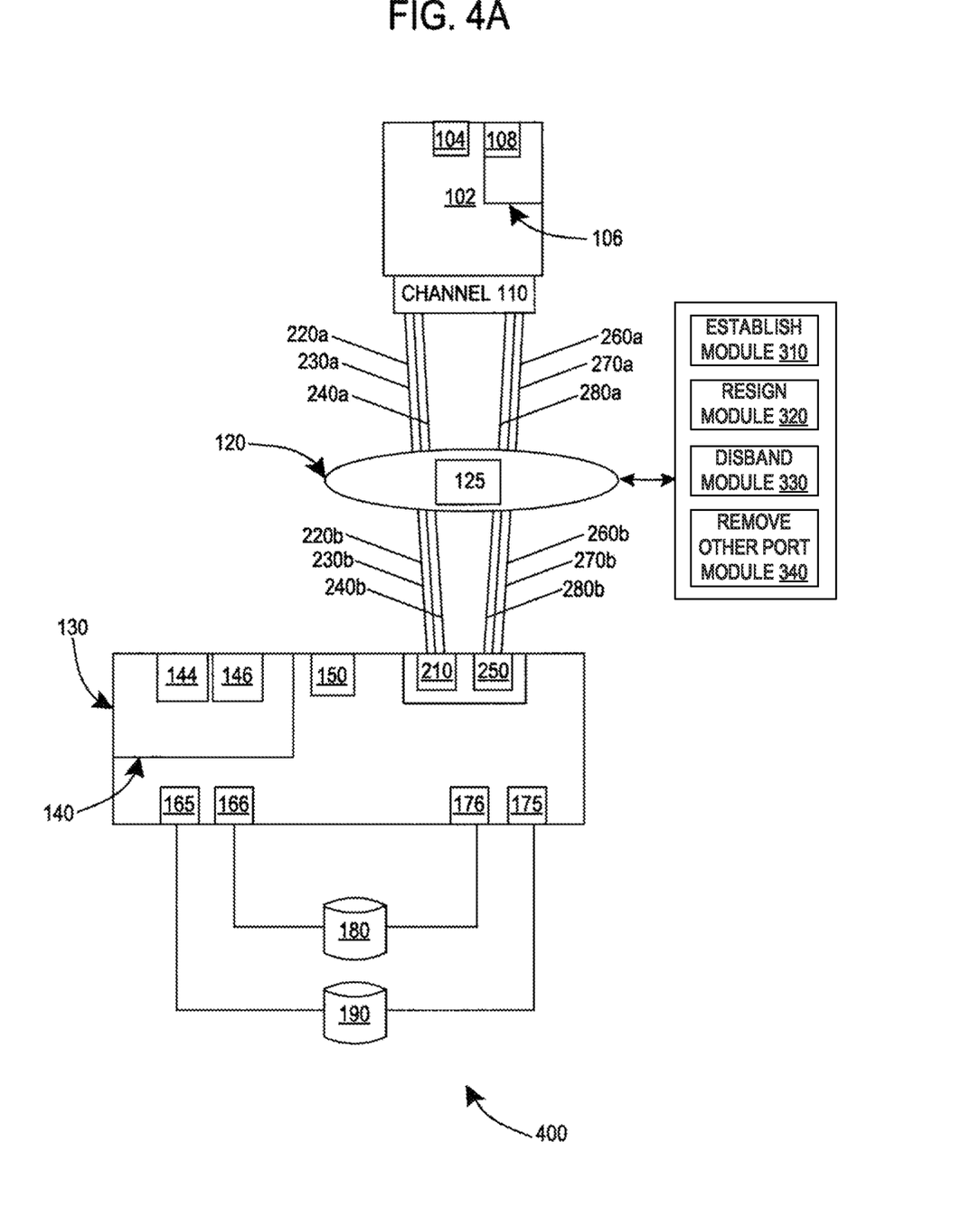
FIG. 4A illustrates the multi-path apparatus of FIG. 3A directly interconnected to a communication fabric.
Figure 4B:
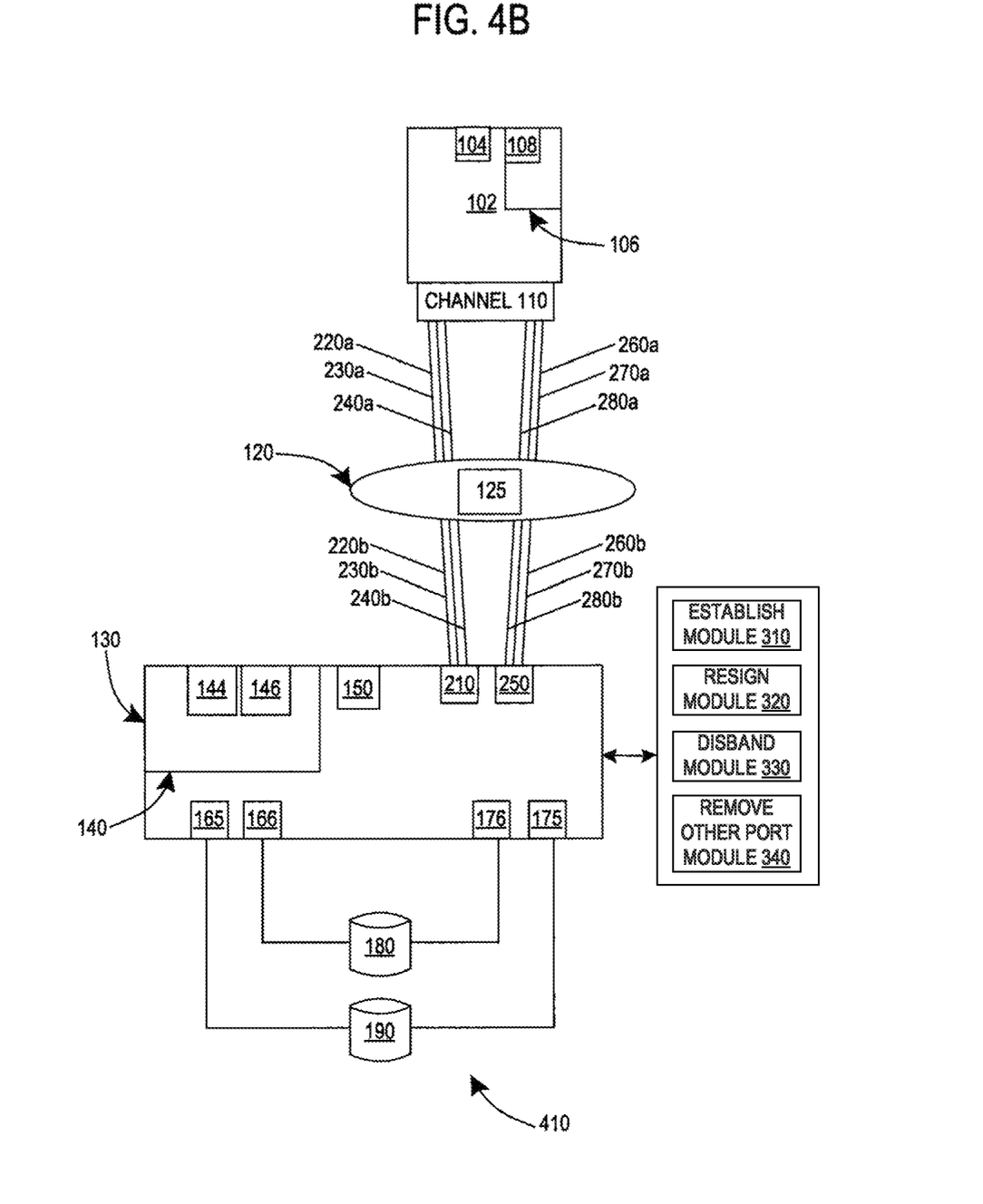
FIG. 4B illustrates the multi-path apparatus of FIG. 3A directly interconnected to a storage controller.
Figure 4C:
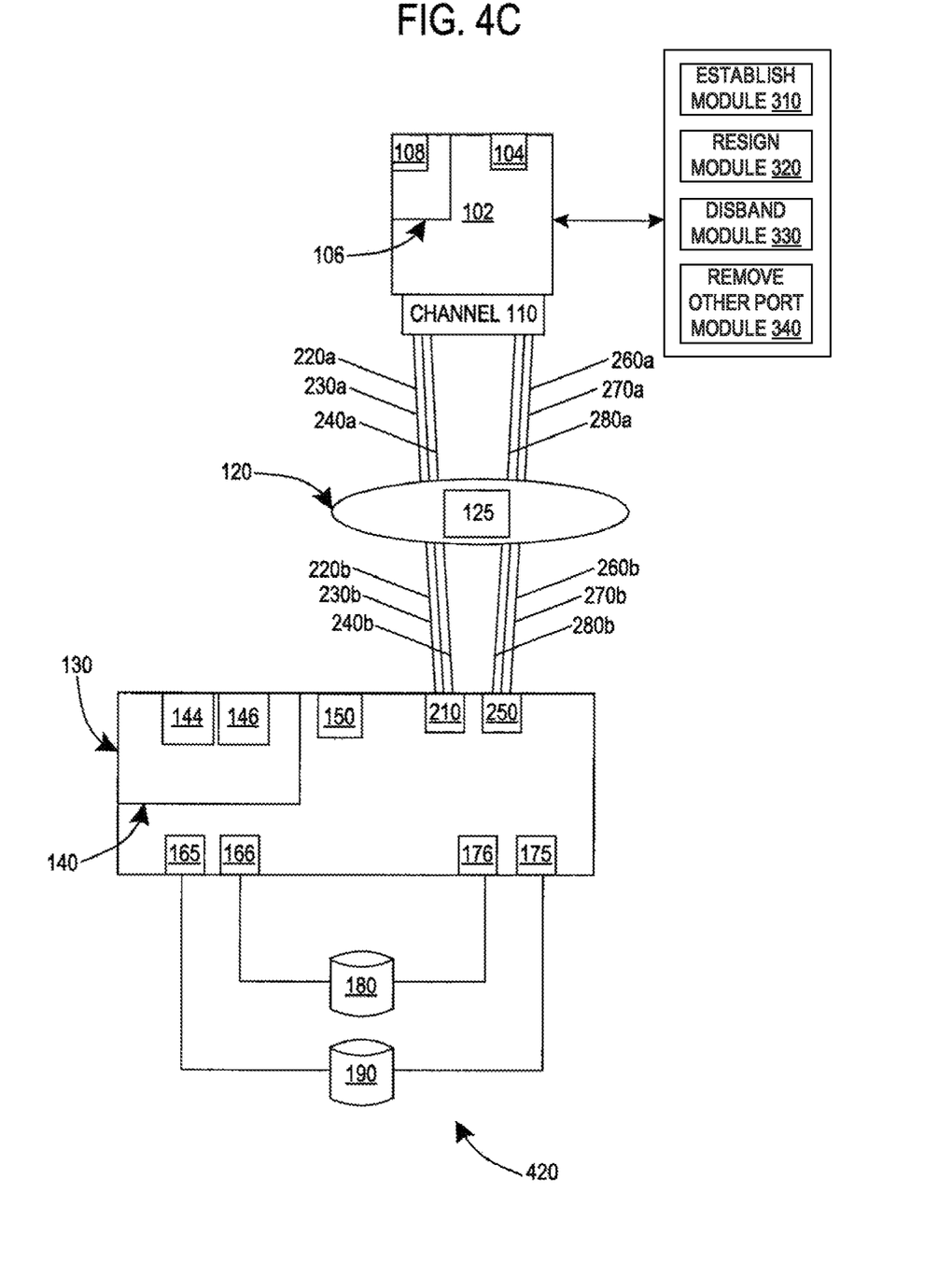
FIG. 4C illustrates the multi-path apparatus of FIG. 3A directly interconnected to a host computer.

FIG. 4A illustrates the multi-path apparatus of FIG. 3A directly interconnected to a communication fabric. FIG. 4B illustrates the multi-path apparatus of FIG. 3A directly interconnected to a storage controller. FIG. 4C illustrates the multi-path apparatus of FIG. 3A directly interconnected to a host computer;

Referring now to FIG. 3B, multi-path reserve/recovery apparatus 300 may issue a Set-Path-group-ID (SPID) command 350, to the storage controller 130. SPID command 350 informs a targeted data storage device, such as data storage device 182, of the identity of the host computer 102 selecting the data storage device 182. SPID command 350 may be issued by one or more modules 310-340 to storage controller 130 to establish, resign, or disband, logical paths and paths groups for a designated data storage device, or to remove a designated port from an existing path group.

As illustrated in FIG. 3B, the command 350 comprises a function control byte (FCB) 360, a path group identification (PGID) 370, and an interface identification (interface ID) 380. In certain embodiments, the command 350 transfers 12 bytes of data to the targeted data storage device including a one byte function code, and an eleven byte path group. In certain embodiments, the command 350 comprises a 2 bit group code in the function byte that comprises one of four values, wherein each value designates either an establish command, resign command, disband command, or remove port command.

For example, in certain embodiments, the FCB 360 describes logically how the paths are to be associated. For example, FCB 360 may identify a group code that describes to a data storage device 182 how paths 220a/b, 230a/b, 240a/b, 260a/b, 270a/b, and 280a/b, are to be logically associated, (e.g., establish, resign, disband, and/or remove port). In certain embodiments, the FCB 360 may indicate a single-path mode or a multi-path mode. For example when the path is set to a multi-path mode, data storage device operations may be initiated over any path of a path group. Accordingly, when a data storage device temporarily ends execution of an I/O operation and disconnects from one path of a path group, that data storage device may subsequently reconnect to another path of the same path group to resume execution of the I/O operation.

Under certain circumstances it is possible that multiple paths traveling through a network, a trunk, a Dense Wavelength Division Multiplexing (DWDM), a SAN, or a switch blade, may have a common failure that causes multi-path errors. DWDMs in particular may fail in a rolling fashion where paths may work then fail, then work, then fail several times before the paths fail permanently. A rolling failure such as this may expose the data storage system to multipath errors.

For example, while data storage device 182 is grouped and reserved, if any path 220a/b, 230a/b, 240a/b, 260a/b, 270a/b, and 280a/b, is removed from the group 290, the reserve remains with the group 290. However, if a data storage device is reserved at the time a disband is performed, the data storage device is no longer grouped, so the reserve remains with the path that issued the SPID disband command. If the path that issued the disband command then fails before the data storage device 130 is regrouped, the reserve is lost, which may cause the original update operation to fail and to "box" the data storage device due to a lost reserved. Thus, the system 100 is exposed multipath errors, such as a rolling failure.

In certain embodiments, Applicants' multi-path reserve/recovery apparatus 300 may be implemented to remove the failed path or failed paths from the path group automatically by issuing a system reset function. For example, the multi-path reserve/recovery apparatus 300 may remove a path, such as path 220A/B from path group 290, by sending a SPID command 350 as a resign command, which removes the path on which the resign command is sent from the path group. In certain embodiments, apparatus 300 may send SPID command 350 via resign module 320.

In certain embodiments, for example, if two or more paths fail in a path group, the multi-path reserve/recovery apparatus 300 may disband and regroup all non-failed paths in the path group. For example, apparatus 300 may issue a first SPID command 350 comprising a disband command that removes all paths from a path group, and then issues a second SPID command 350 comprising an establish command on each removed path. In certain embodiments, the disband module 330 sends the disband command 350. In certain embodiments, the establish module 310 sends the establish command 350 to regroup the non-failing paths.

In certain embodiments, to avoid disbanding of all paths in a path group, the multi-path reserve/recovery apparatus 300 may send a SPID command 350 that comprises a remove port command on a non-failed path to remove the failed path(s) from path group. For example, to remove just the paths through control unit port 250 from a path group 290, apparatus 300 issues a remove port command on a path interconnected with control unit port 210.

FIG. 5 summarizes the steps of Applicants' method to adjust a multi-path data storage device reservation. Referring now to FIG. 5, in step 510 the method supplies a computing device, such as computing device 102, a storage controller, such as storage controller 130, and a communication link interconnecting the computing device and the storage controller. In certain embodiments, the communication link of step 510 comprises a first communication link, such as communication link 110a, interconnecting a channel path identifier, such as CHPid 103, disposed in the computing device with a communication fabric, such as fabric 120, comprising one or more switches, such as switches 125, and a second communication link, such as communication link 110b, interconnecting the fabric with a host adapter, such, as host adapter 132, disposed in the storage controller.

In step 520, the method configures a first path group, such as path group 290 (FIG. 2B), comprising one or more communication paths disposed in the communication link of step 510. In certain embodiments, step 520 further comprises issuing a SPID command, such as SPID command 350, comprising an establish command to configure the first path group.

In certain embodiments, step 520 is performed by a processor disposed in the computing device of step 510. In certain embodiments, step 520 is performed by a processor disposed in the storage controller of step 510.

In certain embodiments, step 520 is performed by a multi-path apparatus, such as multi-path apparatus 300 (FIG. 3A). In certain embodiments, the multi-path apparatus is interconnected with the computing device of step 510. In certain embodiments, the multi-path apparatus is interconnected with the storage controller of step 510. In certain embodiments, the multi-path apparatus is interconnected with the communication fabric.

In step 530, the method reserves a data storage device, such as data storage device 182, in communication with the storage controller of step 510. In certain embodiments, step 530 is performed by a processor disposed in the computing device of step 510. In certain embodiments, step 530 is performed by a processor disposed in the storage controller of step 510.

In certain embodiments, step 530 is performed by a multi-path apparatus, such as multi-path apparatus 300 (FIG. 3A). In certain embodiments, the multi-path apparatus is interconnected with the computing device of step 510. In certain embodiments, the multi-path apparatus is interconnected with the storage controller of step 510. In certain embodiments, the multi-path apparatus is interconnected with the communication fabric.

In step 540, the method detects one or more failed communication paths, such as failed communication path 260a/b (FIG. 2C), wherein those one or more failed communication paths are configured in the path group of step 520, and wherein those one or more failed communication paths utilize a control unit port, such as control unit 250, disposed in a host adapter, such as host adapter 132, disposed in the storage controller of step 510. By "failed communication path," Applicants mean a communication path that supports either intermittent communication or no communication between the computing device of step 510 and the storage controller of step 510.

In certain embodiments, step 540 is performed by a processor disposed in the computing device of step 510. In certain embodiments, step 540 is performed by a processor disposed in the storage controller of step 510.

In certain embodiments, step 540 is performed by a multi-path apparatus, such as multi-path apparatus 300 (FIG. 3A). In certain embodiments, the multi-path apparatus is interconnected with the computing device of step 510. In certain embodiments, the multi-path apparatus is interconnected with the storage controller of step 510. In certain embodiments, the multi-path apparatus is interconnected with the communication fabric.

In step 550, the method configures a second path group, such as second path group 295 (FIG. 2C), wherein that second path group does not comprise the one or more failed communication paths. In certain embodiments, step 550 comprises issuing a SPID command comprising a remove port command, wherein the remove port command comprises an interface_id specifying a control unit port utilized by the one or more failed communication links. In certain embodiments, step 550 further comprises verifying a communication path group id, and removing from that communication path group all communication paths passing through the specified control unit port.

In certain embodiments, step 550 further comprises determining if any of the communication paths configured in the first path group of step 520 pass through the specified control unit port, and if none of the first communication paths pass through that specified control unit port, taking no action, and maintaining the data storage device reservation of step 530 with the first communication path group.

In certain embodiments, step 550 further comprises determining if the remove port command was received via the specified control unit port, and if that remove port command was received on the specified control unit port, then configuring the second communication path group by removing all communication paths passing through the specified control unit port from the first communication path group.

In certain embodiments, step 550 further comprises determining if all communication paths have been removed from the reserved device of step 530, and if all communication paths have been removed from the reserved device, then maintaining the device reservation with a communication path that issued the remove port command.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to adjust a multi-path device reservation, comprising:

supplying a computing device and a storage controller interconnected with physical communication path;

supplying a multi-path reserve/recovery apparatus external to both said computing device and said storage controller, and in communication with said input output channel, and comprising an establish module, a resign module, a disband module, and a remove other port module;

configuring by said multi-path reserve/recovery apparatus said physical communication path to comprise a first plurality of logical communication path;

configuring by said multi-path reserve/recovery apparatus a first communication path group to include a second plurality of the logical communication paths, wherein the first plurality of logical communication paths is greater than the second plurality of logical communication paths;

reserving by said multi-path reserve/recovery apparatus, for a period of time to perform a sequence of operations, a data storage device in communication with said storage controller, wherein said data storage device reservation is held by said first communication path group;

detecting by said multi-path reserve/recovery apparatus a failed communication path configured in said first communication path group;

configuring a second communication path group by removing said failed communication path from said first communication path group, wherein said second communication path group maintains said data storage device reservation, issuing by said multi-path reserve/recovery apparatus a remove port command, wherein:

said issuing step comprises generating by said multi-path reserve/recovery apparatus a remove port command reciting an interface_id specifying said first control unit port, and issuing said remove port command to said storage controller using any of said plurality of control unit ports except said first control unit port, said storage controller comprises a plurality of control unit ports;

said first plurality of communication paths interconnect with said storage controller using said plurality of control unit ports;

said failed communication path interconnects with said storage controller using a first control unit port, wherein said first control unit port is one of said plurality of control unit ports, generating by said multi-path reserve/recovery apparatus a two byte interface_id that is data storage device independent, and that uniquely identifies a control unit port that is to be remove from the communication path group by the remove port command;

verifying a communication path group id;

removing communication paths to said reserved data storage device that utilize the first control unit port;

determining by said multi-path reserve/recovery apparatus if any of said first communication paths utilize said first control unit port;

operative if none of said first communication paths utilize said first control unit port:

taking no action;

maintaining said device reservation with said first communication path group.

2. The method of claim 1, wherein said issuing step comprises:

forming by said multi-path reserve/recovery apparatus a Set-Path-group-ID ("SPID") command comprising 12 bytes of data including a one byte function code and an 11 byte communication path id, wherein said one byte function code comprises a 2 bit group code;

setting by said multi-path reserve/recovery apparatus said 2 bit group code to indicate that said SPID command comprises said remove port command.

3. The method of claim 1, further comprising operative if any of said first communication paths utilize said first control unit port, configuring by said multi-path reserve/recovery apparatus a second communications path group by removing paths that utilize said first control unit port.

4. The method of claim 1, further comprising:

determining by said multi-path reserve/recovery apparatus if all communication paths have been removed from said reserved data storage device;

operative if all communication paths have been removed from said reserved data storage device, maintaining said device reservation with a communication path that issued said remove port command.

5. A multi-path reserve/recovery apparatus external but in communication with a physical communication path interconnecting a computing device and a storage controller comprising a plurality of control unit ports and a computer readable medium having computer readable program code disposed therein to adjust a multi-path data storage device reservation, the computer readable program code comprising a series of computer readable program steps to effect:

configuring by said multipath reserve/recovery apparatus said physical communication path to comprise a first plurality of logical communication paths;

configuring by said multi-path reserve/recovery apparatus a first communication path group to include a second plurality of the logical communication paths, wherein the first plurality of logical communication paths is greater than the second plurality of logical communication paths;

reserving, for a period of time to perform a sequence of operations, a data storage device in communication with said storage controller, wherein said data storage device reservation is held by a said first communication path group;

detecting by said multi-path reserve/recovery apparatus a failed communication path configured in said first communication path group;

configuring a second communication path group by removing said failed communication path from said first communication path group, wherein said second communication path group maintains said data storage device reservation;

issuing a remove port command;

generating a remove port command reciting an interface_id identifying said first control unit port;

issuing said remove port command to said storage controller using any of said plurality of control unit ports except said first control unit port, wherein:

a first plurality of communication paths interconnect with said storage controller using said plurality of control unit ports;

said failed communication path interconnects with said storage controller using a first control unit port, wherein said first control unit port is one of said plurality of control unit ports.

6. The multi-path reserve/recovery apparatus of claim 5, wherein said computer readable program code to generate a remove port command further comprises a series of computer readable program steps to effect:

forming a Set-Path-group-ID ("SPID") command comprising 12 bytes of data including a one byte function code and an 11 byte communication path id, wherein said one byte function code comprises a 2 bit group code;

setting said 2 bit group code to indicate that said SPID command comprises said remove port command.

7. A storage controller comprising a plurality of control unit ports, an integral multi-path reserve/recovery apparatus, said storage controller comprising a computer readable medium having computer readable program code disposed therein to adjust a multi-path data storage device reservation, wherein said storage controller is interconnected with a computing device via an input output channel, the computer readable program code comprising a series of computer readable program steps to effect:

configuring said physical communication path to comprise a first plurality of logical communication paths;

configuring a first communication path group to include a second plurality of the logical communication paths, wherein the first plurality of logical communication paths is greater than the second plurality of logical communication paths;

reserving by said multi-path reserve/recovery apparatus, for a period of time to perform a sequence of operations, a data storage device in communication with said storage controller, wherein said data storage device reservation is held by said first communication path group;

detecting by said multi-path reserve/recovery apparatus a failed communication path configured in said first communication path group;

receiving a remove port command reciting an interface_id identifying a first control unit port, wherein said first control unit port is one of said plurality of control unit ports, generating by said multi-path reserve/recovery apparatus a two byte interface_id that is data storage device independent, and that uniquely identifies a control unit port that received the remove port command;

verifying by said multi-path reserve/recovery apparatus the communication path group id;

removing by said multi-path reserve/recovery apparatus communication paths to said reserved data storage device that utilize the first control unit port, determining by said multi-path reserve/recovery apparatus if any of said first communication paths utilize said first control unit port;

operative if none of said first communication paths utilize said first control unit port;

taking no action;

maintaining said device reservation with said first communication path group, operative if any of said first communication paths utilize said first control unit port, configuring by said multi-path reserve/recovery apparatus a second communications path group by removing paths that utilize said first control unit port.

8. The storage controller of claim 7, said computer readable program code further comprising a series of computer readable program steps to effect:

determining by said multi-path reserve/recovery apparatus if all communication paths have been removed from said reserved data storage device;

operative if all communication paths have been removed from said reserved data storage device, maintaining said device reservation with a communication path that issued said remove port command.

9. A computer program product encoded in a computer readable medium and useable with a programmable computer processor to adjust a multi-path data storage device reservation disposed in a storage system comprising a computing device interconnected by an input output channel to a storage controller using a multi-path reserve/recovery apparatus external to both said computing device and said storage controller, and in communication with said input output channel, and comprising an establish module, a resign module, a disband module, and a remove other port module, the computer program product comprising:

computer readable program code which causes said programmable processor to configure by said multi-path reserve/recovery apparatus said physical communication path to comprise a first plurality of logical communication paths;

computer readable program code which causes said programmable processor to configure by said multi-path reserve/recovery apparatus a first communication path group to include a second plurality of the logical communication paths, wherein the first plurality of logical communication paths is greater than the second plurality of logical communication paths;

computer readable program code which causes said programmable processor to reserve by said multi-path reserve/recovery apparatus, for a period of time to perform a sequence of operations, a data storage device in communication with said storage controller, wherein said data storage device reservation is held by said first communication path group;

computer readable program code which causes said programmable processor to detect by said multi-path reserve/recovery apparatus a failed communication path configured in said first communication path group;

computer readable program code which causes said programmable processor to configure a second communication path group by removing said failed communication path from said first communication path group, wherein said second communication path group maintains said data storage device reservation;

computer readable program code which causes said programmable processor to issue by said multi-path reserve/recovery apparatus a remove port command;

wherein said computer readable program code which causes said programmable processor to issue a remove port command comprises computer readable program code which causes said programmable processor to form by said multi-path reserve/recovery apparatus a Set-Path-group-ID ("SPID") command comprising 12 bytes of data including a one byte function code and an 11 byte communication path id, wherein said one byte function code comprises a 2 bit group code;

computer readable program code which causes said programmable processor to set by said multi-path reserve/recovery apparatus said 2 bit group code to indicate that said SPID command comprises said remove port command;

computer readable program code which causes said programmable processor to generate by said multi-path reserve/recovery apparatus a two byte interface_id that is data storage device independent, and that uniquely identifies a control unit port that is to be remove from the communication path group by the remove port command;

computer readable program code which causes said programmable processor to verify the communication path group id;

computer readable program code which causes said programmable processor to remove communication paths to said reserved data storage device that utilize the first control unit port;

wherein:

said storage controller comprises a plurality of control unit ports, and said first plurality of communication paths interconnect with said storage controller using said plurality of control unit ports;

said failed communication path interconnects with said storage controller using a first control unit port;

said first control unit port is one of said plurality of control unit ports, said computer readable program code which causes said programmable processor to generate a remove port command further comprises computer readable program code which causes said programmable processor to generate a remove port command reciting an interface_id identifying said first control unit port, further comprising computer readable program code which causes said programmable processor to issue said remove port command to said storage controller using any of said plurality of control unit ports except said first control unit port.

* * * * *